United States Patent
Haase

(10) Patent No.: US 8,504,925 B1
(45) Date of Patent: Aug. 6, 2013

(54) AUTOMATED ANIMATED TRANSITIONS BETWEEN SCREENS OF A GUI APPLICATION

(75) Inventor: Chet S. Haase, Pleasanton, CA (US)

(73) Assignee: Oracle America, Inc., Redwood City, CA (US)

(*) Notice: Subject to any disclaimer, the term of this patent is extended or adjusted under 35 U.S.C. 154(b) by 1586 days.

(21) Appl. No.: 11/475,693

(22) Filed: Jun. 26, 2006

Related U.S. Application Data

(60) Provisional application No. 60/694,485, filed on Jun. 27, 2005, provisional application No. 60/694,527, filed on Jun. 27, 2005.

(51) Int. Cl.
*G06F 3/00* (2006.01)

(52) U.S. Cl.
USPC ............................. 715/746; 715/762; 715/768

(58) Field of Classification Search
USPC .......................................... 715/746, 762, 768
See application file for complete search history.

(56) References Cited

U.S. PATENT DOCUMENTS

| | | | |
|---|---|---|---|
| 5,202,961 A | 4/1993 | Mills et al. | |
| 5,359,712 A | 10/1994 | Cohen et al. | |
| 5,428,730 A | 6/1995 | Baker et al. | |
| 5,764,226 A | 6/1998 | Consolatti et al. | |
| 5,767,835 A | 6/1998 | Obbink et al. | |
| 5,880,729 A | 3/1999 | Johnston et al. | |
| 5,956,029 A | 9/1999 | Okada et al. | |
| 5,999,195 A * | 12/1999 | Santangeli | 345/473 |
| 6,134,547 A | 10/2000 | Huxley et al. | |
| 6,404,441 B1 | 6/2002 | Chailleux | |
| 6,460,040 B1 * | 10/2002 | Burns | 715/762 |
| 6,573,915 B1 | 6/2003 | Sivan et al. | |
| 7,506,267 B2 | 3/2009 | Baxter et al. | |
| 2003/0008266 A1 | 1/2003 | LoSasso et al. | |
| 2003/0052921 A1 | 3/2003 | Ulrich et al. | |
| 2004/0046792 A1 | 3/2004 | Coste et al. | |
| 2006/0150104 A1 | 7/2006 | Lira | |
| 2008/0303828 A1 | 12/2008 | Marchant et al. | |

OTHER PUBLICATIONS

Microsoft Office Power Point 2003 SP2; Microsoft Office Professional Edition 2003; Copyright 1987-2003.*
U.S. Appl. No. 11/475,520, filed Jun. 2006, Haase et al.

* cited by examiner

*Primary Examiner* — Nicholas Augustine
*Assistant Examiner* — Andres E Gutierrez
(74) *Attorney, Agent, or Firm* — Martine Penilla Group, LLP

(57) ABSTRACT

A computer implemented method for transitioning a component between graphical user interface screens is provided. The method initiates with identifying a start state of the component within a transition panel. An end state of the component is identified within the transition panel and timer logic is triggered to periodically call a transition engine. An effects engine is called in response to the triggering and a next state of the component is rendered into an animation layer. The next state of the component is then displayed. A transition framework is also provided.

18 Claims, 13 Drawing Sheets

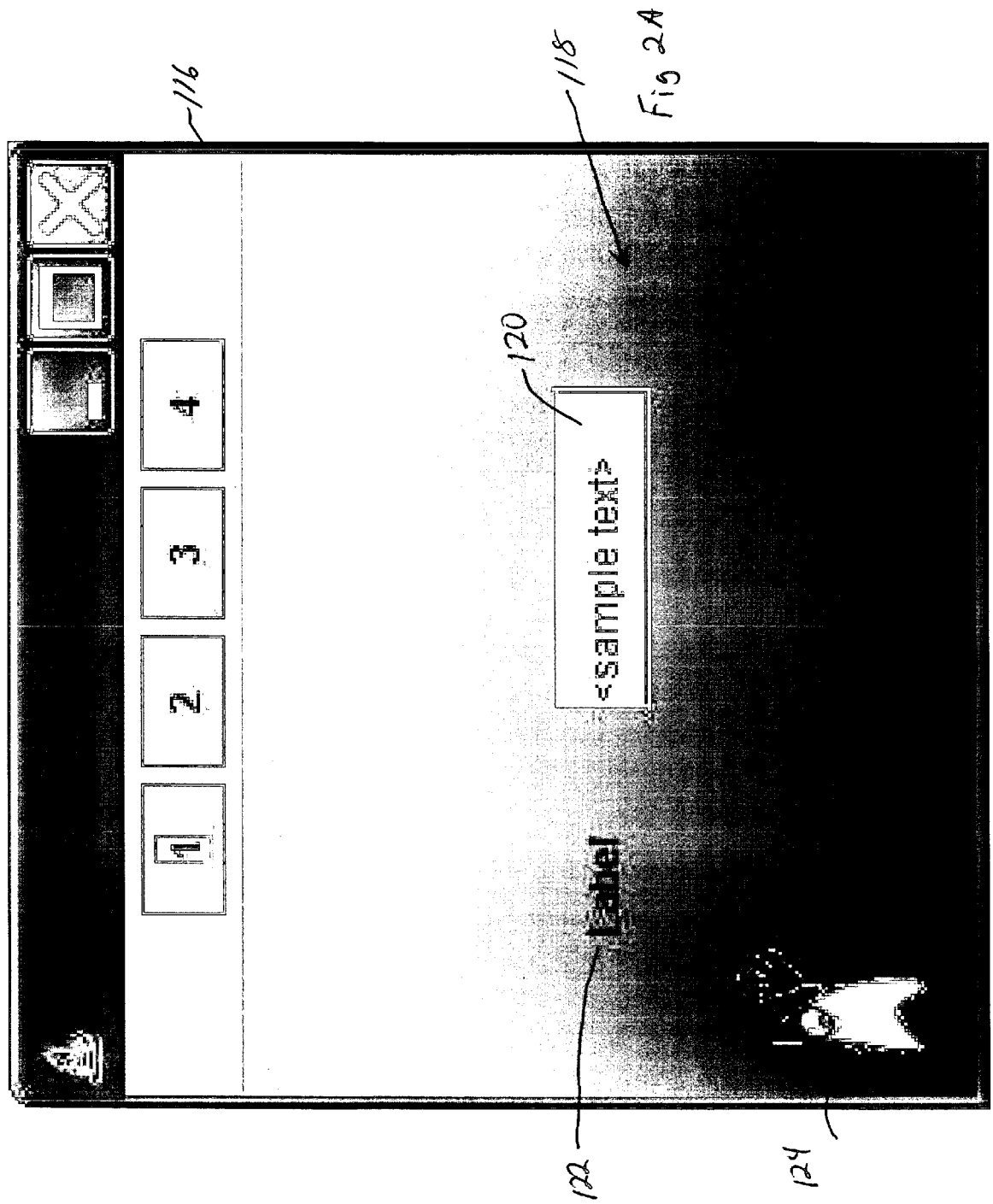

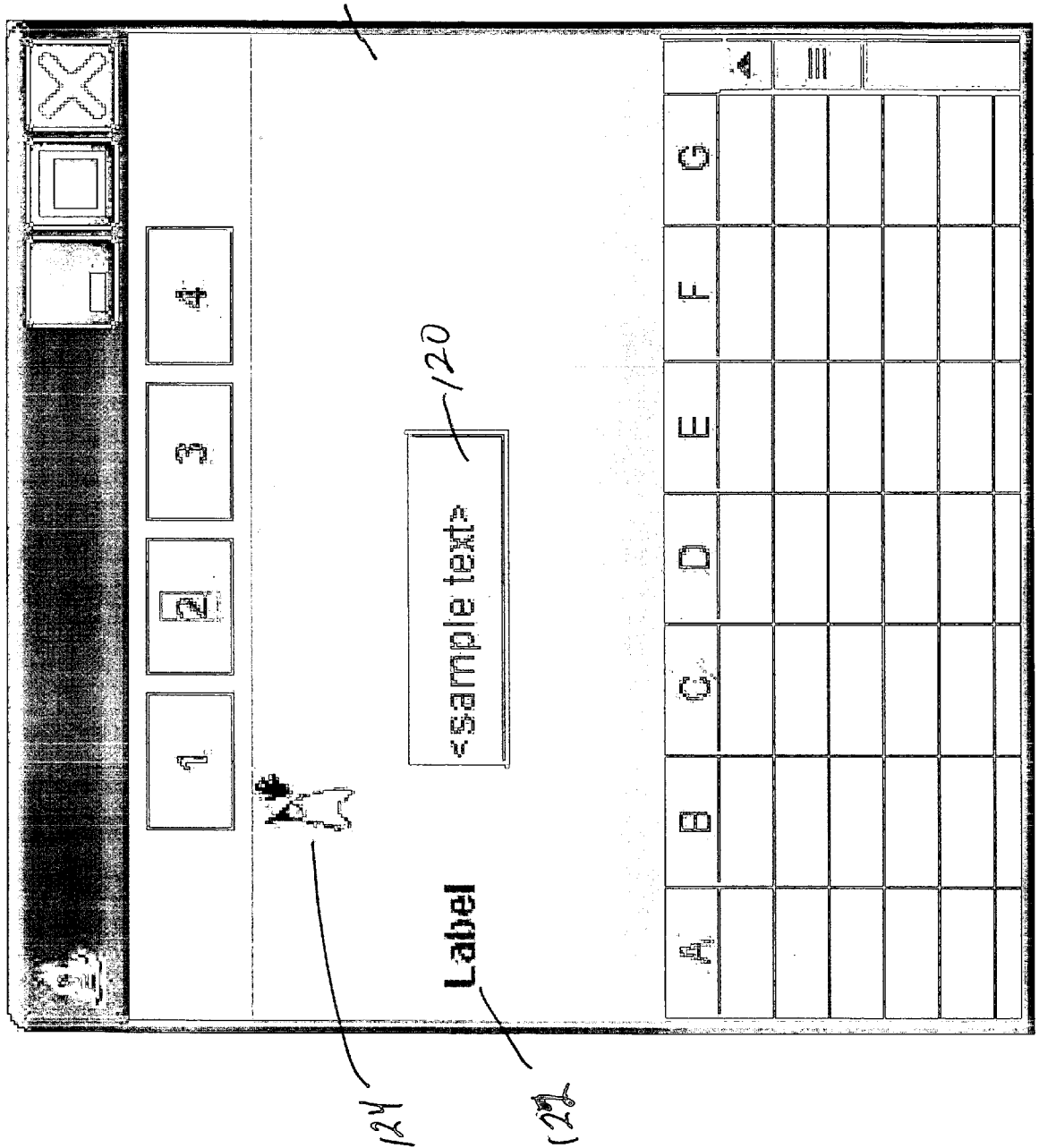

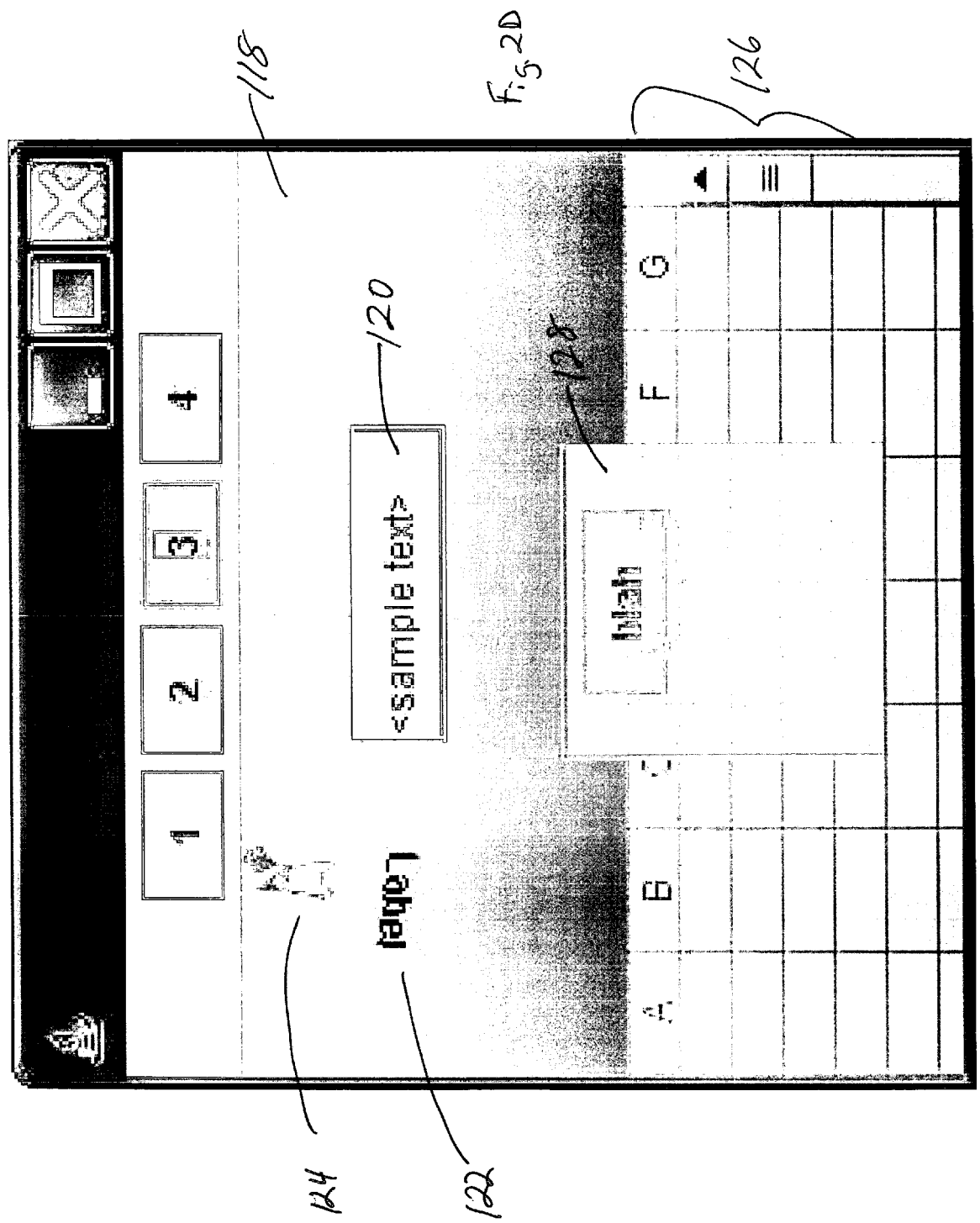

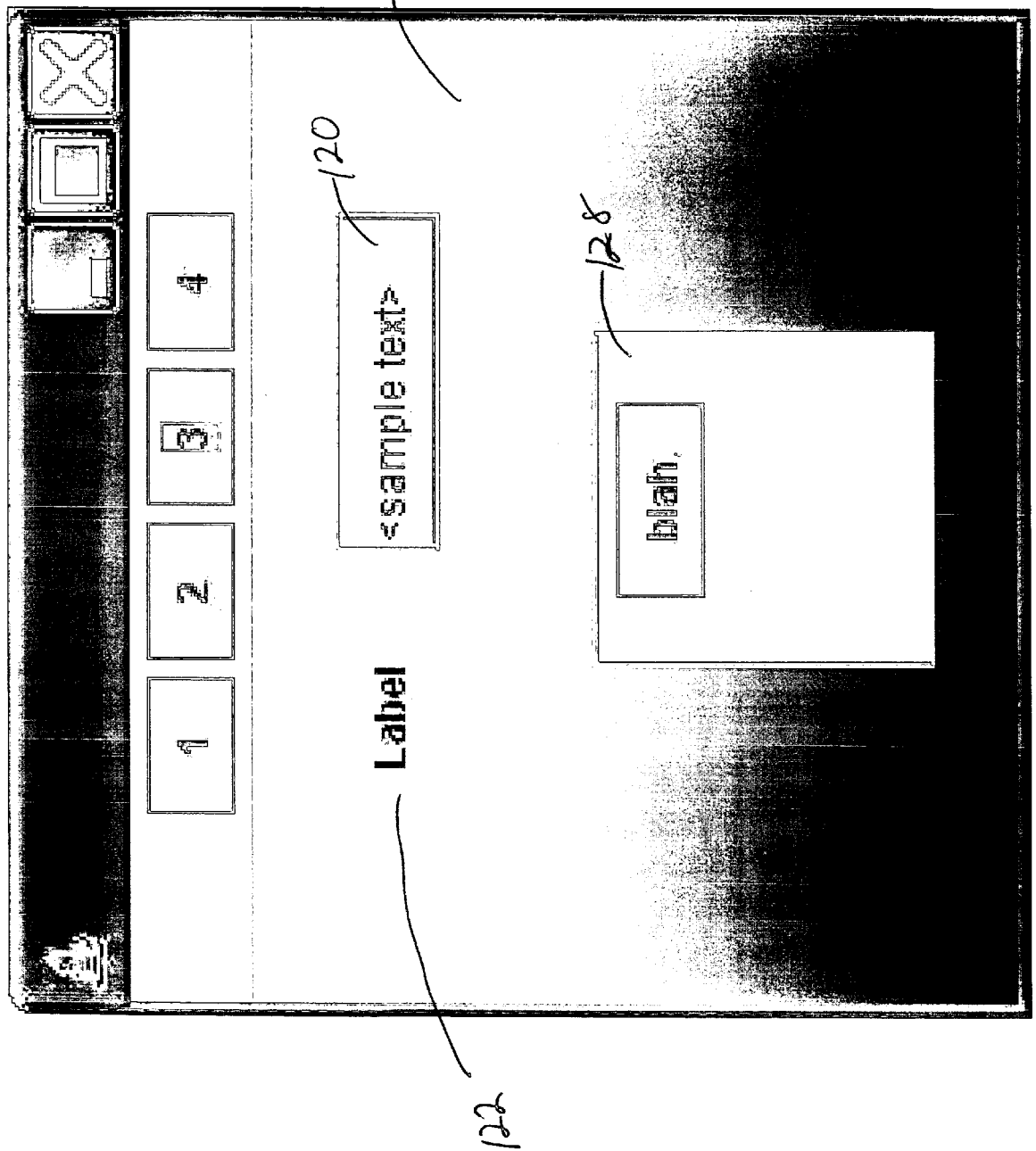

Step 1: User submits query into application container

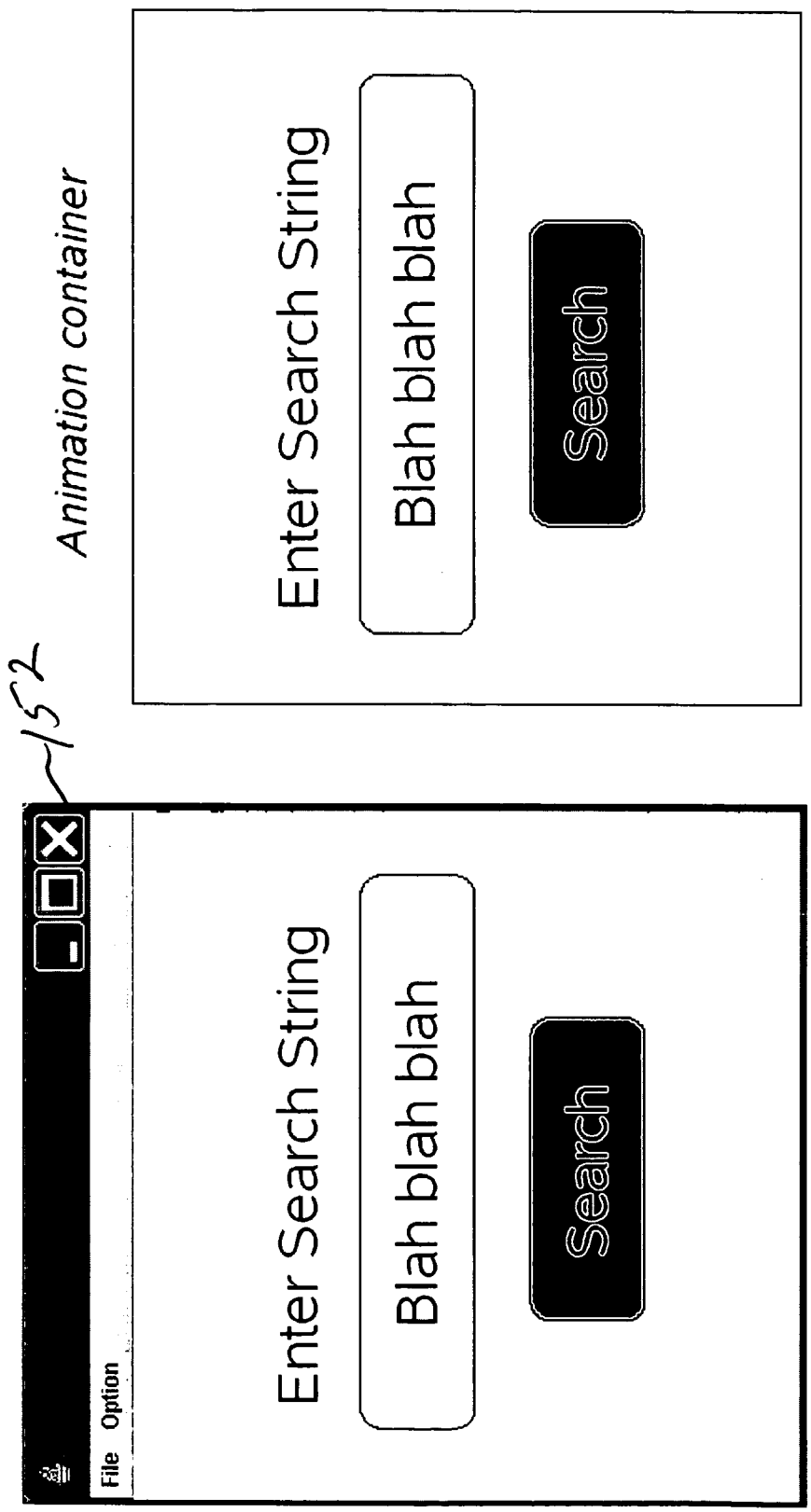

Step 3: Animation container swapped for application container

Step 4: Application arranges state for next screen

Step 5: Animation runs onscreen: text field and Search button move/resize, results fade/move in, "Enter Search Sting" text fades/moves out Step 6: Animation ends, animation container swapped for application co

US 8,504,925 B1

AUTOMATED ANIMATED TRANSITIONS BETWEEN SCREENS OF A GUI APPLICATION

CLAIM OF PRIORITY

This Application claims priority from U.S. Provisional Patent Application No. 60/694,485, filed on Jun. 27, 2005, entitled "AUTOMATED ANIMATED TRANSITIONS BETWEEN SCREENS OF A GUI APPLICATION", which is herein incorporated by reference. This Application also claims priority from U.S. Provisional Patent Application No. 60/694,527, filed on Jun. 27, 2005, entitled "FRAMEWORK FOR TRANSITION EFFECTS FOR GUI COMPONENTS", which is herein incorporated by reference.

CROSS REFERENCE TO RELATED APPLICATION

This Application is related to U.S. patent application Ser. No. 11/475,520, entitled "EFFECT FRAMEWORK FOR GUI COMPONENTS", filed on the same day as the instant application, and is herein incorporated by reference.

BACKGROUND

Developers face the tedious task of having to manually code animated transitions between screens. While these transitions provide a richer environment to operate in, the burden placed on the developers becomes a barrier to the utilization of the animated transitions. The developers must hardcode the effects that occur on components and the logic that makes them work. When multiple effects are considered, even more coding is required. Consequently, the use of animated transitions between screens is not as prevalent as would be otherwise.

Picture a typical forms-based application. The user is presented with a GUI consisting of various widgets such as text, text fields, buttons, list-boxes, and checkboxes, which they fill-out, select, and click appropriately. The user then clicks on the ever-present "Submit" button which usually results in this GUI disappearing and then, after some delay, being replaced by a completely different GUI experience. The new GUI presents more text fields, more information, more buttons, but mostly new items in different places.

Users usually puzzle over the new GUI for a bit, then proceed to fill out the information appropriately, click another Submit button, and thus continue on in their journey through the application. This application is typical an HTML-based web application, where the GUIs tend to be very static (and where the capabilities of the viewing application tend to be more limited than, say, a rich-client toolkit). But it is really the same in most applications, regardless of language and toolkit choice. It is simply the easiest and most obvious way for such applications to work; the user fills out the information needed by the server, they submit this info, the server processes the entry data, and then GUI displays the results and asks for more information, as appropriate.

The difficulty for the user is in constantly being presented with new GUIs that must be read to understand what action must be taken next. Sometimes, the user may be transitioned to a new screen, with little information as to why the user ended up at that page. Consequently, many of today's GUI navigation processes fail to provide users with the logical connection of who transitions occurred between states.

There exists a need to enable the use of animated transitions between screens in a simplified manner, in order to alleviate the burden currently imposed on developers.

SUMMARY

Embodiments of the present invention provide a framework for enabling automation of the animated transitions to simplify the programming required by the end user.

In one embodiment, a computer implemented method for transitioning a component between graphical user interface screens is provided. The method initiates with identifying a start state of the component within a transition panel. An end state of the component is identified within the transition panel and timer logic is triggered to periodically call a transition engine. An effects engine is called in response to the triggering and a next state of the component is rendered into an animation layer. The next state of the component is then displayed.

In another embodiment, a transition framework configured to present animations between graphical user interface (GUI) screens is provided. The transition framework includes a transition system configured to communicate with an application the display of image data. The transition system includes a transition engine configured to initiate the animations by calling timer logic. The transition system also includes an animation layer configured to store image data representing successive animation transitions in response to corresponding successive invocations initiated by the timer logic. The transition system includes a container layer configured to store image data representing an end state of the animations. The transition framework includes an effects engine in communication with the transition system. The effects engine calculates position data for components associated with each successive animation transition. The effects engine writes the transition data into the animation layer for display, wherein the transition system extracts both a first state of components within a GUI screen and an end state of components within the GUI screen. The first state and the end state represent limits as to the components of the animation transitions.

Other exemplary embodiments defined part of this invention, and such embodiments are described with reference to the attached figures and written description.

BRIEF DESCRIPTION OF TILE DRAWINGS

The accompanying drawings, which are incorporated in and constitute part of this specification, illustrate exemplary embodiments of the invention and together with the description serve to explain the principles of the invention.

FIGS. 2A through 2E illustrate a graphical user interface having a transition panel in which components are transitioning through animated effects in accordance with one embodiment of the invention.

FIGS. 4A through 4F illustrate the process of the transition in accordance with one embodiment of the invention.

DETAILED DESCRIPTION

Figure 1:
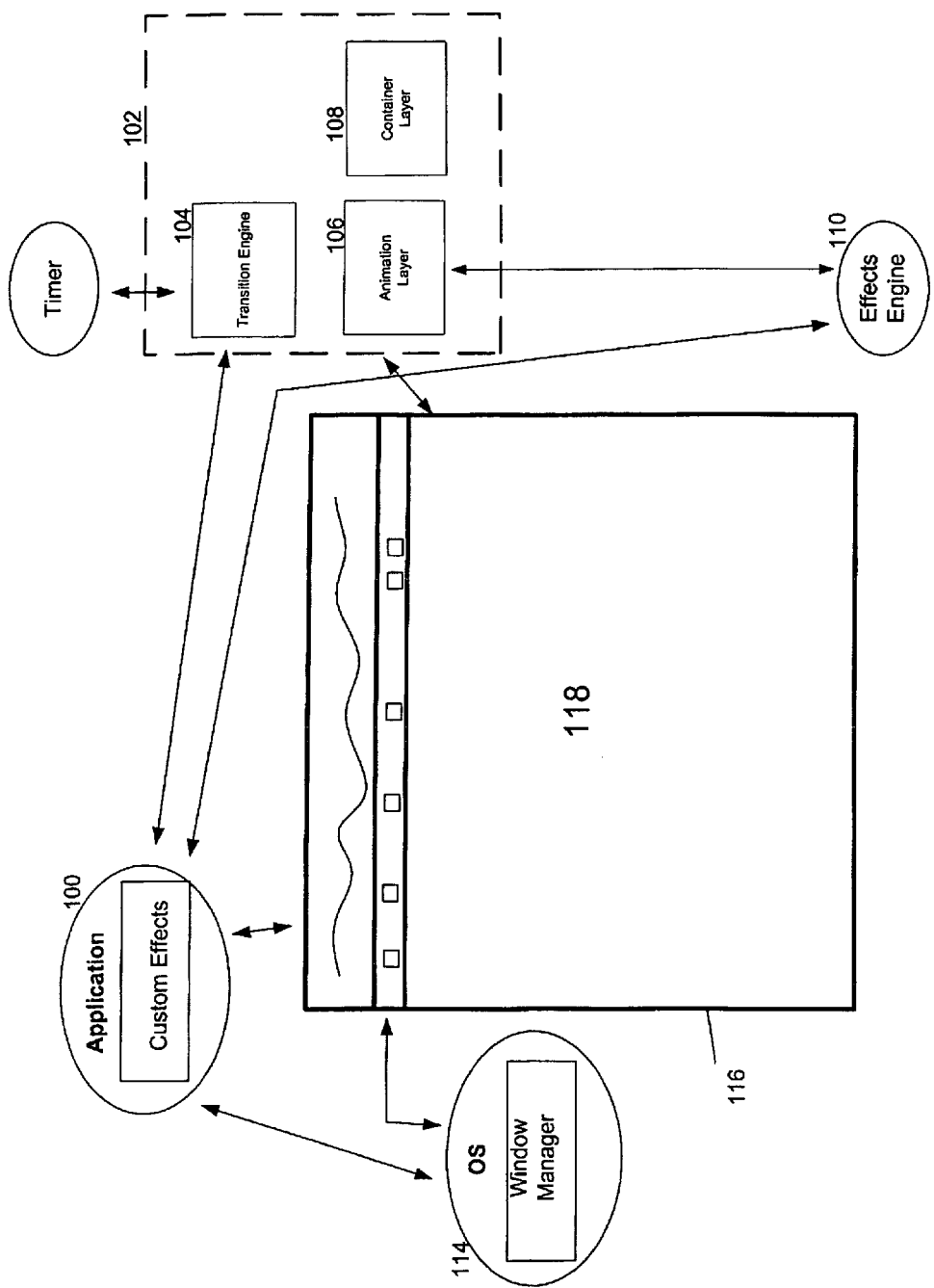
FIG. 1 is a simplified schematic diagram illustrating an animation transition system in accordance with one embodiment of the invention.
Figure 2B:
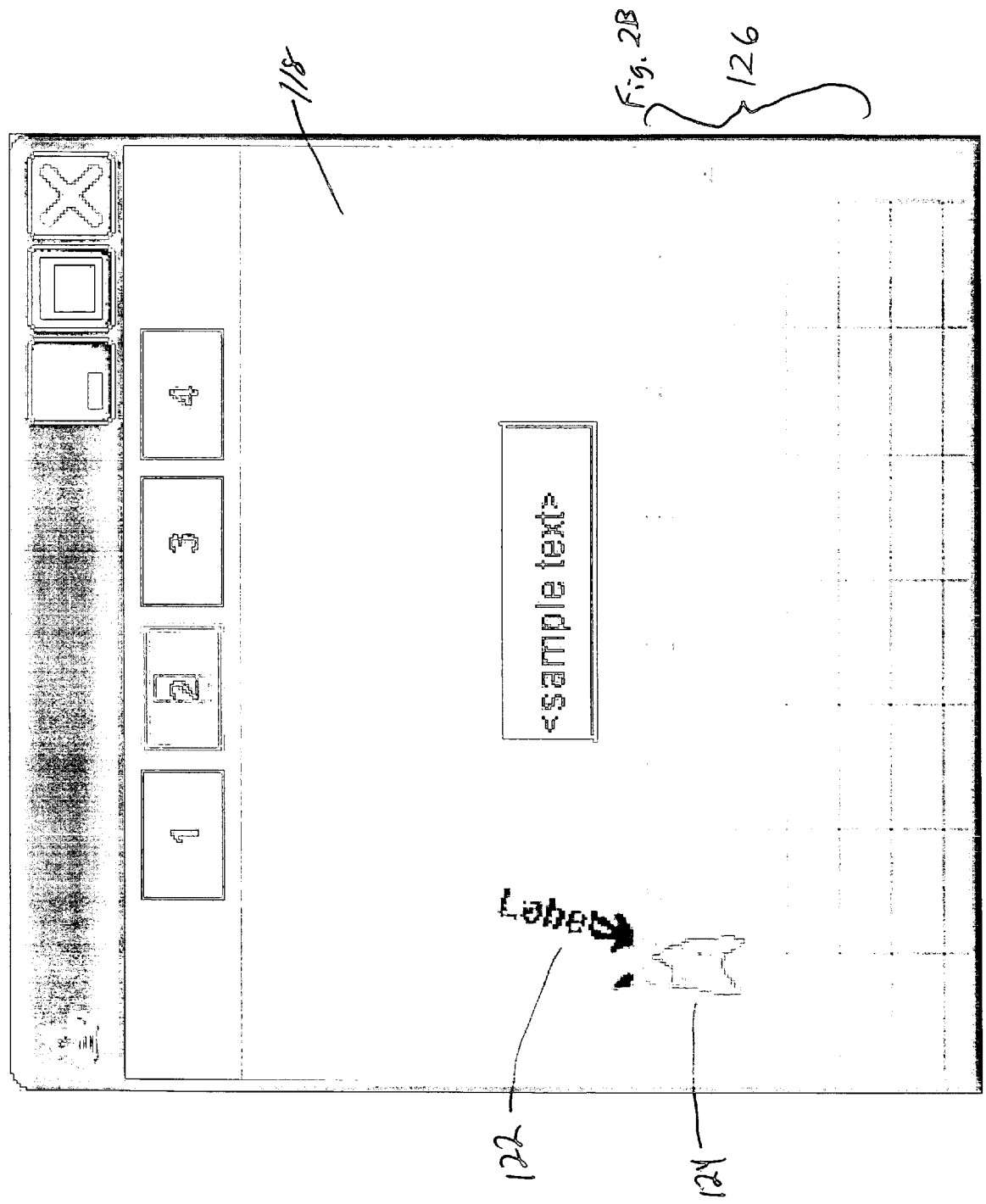

An invention is described for a framework simplifying the employment of animated transitions between screens of an application. It will be obvious, however, to one skilled in the art, that the present invention may be practiced without some or all of these specific details. In other instances, well known process operations have not been described in detail in order not to unnecessarily obscure the present invention.

In one embodiment, animated transitions are provided for graphic user interface (GUI) libraries. The animated transitions provide a way to keep users more connected to an application as it changes states. As a feature of this invention, applications are allowed to change states smoothly from one state to another, such as for example, moving a text field out of the way and fading in a table of data. This operation paradigm is contrary to most applications today, especially HTML-based applications, which simply erase the current state of the application and then draw in the new state. By using effects such as transition, scaling, and fading, applications can make graphical user interface (GUI) transitions easier and, in turn, make the users more productive. However, these effects have not been able to be implemented in a manner that is user-friendly. In particular, assembling the possible effects into a system that actually transitions between application states can be very involved. A developer will have to manually code each effect, which becomes tedious. Additionally, when many components have transitions showing special effects per screen, each of the components would have to be manually set up and the transitions for each of these components would have to be manually set up.

The embodiments described herein automate the transition process for entire screens of an application, thereby making these applications easier to write for the developer. For example, in one embodiment, instead of having to manually animate a transition of a button from one area to another area of the GUI, or a text field from a first size to a second size, or to fade in a table or some other component, the embodiments described herein allow a developer or user to declare the elements of each screen of an application. Then, the system can automate the transitions between screens. That is, if a user declares a button to be in one position on one screen and a different position on the next screen, then the system described herein would automate the animated transition from the first to the second position. In one embodiment, the effect applied to the button can be specified and thereafter rendered by an effects engine. A framework for supporting effects in a generic, extensible, and pluggable way such that applications do not need to manually write the code to handle the animation effects that are used is described in more detail below. As will be described further, the animated transition system automates transitions between entire states of an application.

The system functions by having the developer declare separate screens of the applications. In one embodiment, this can be achieved in any way that is compatible with the code running the actual application. For example, there may be a system that allows the user to describe the GUI screens declaratively, an XML or some other persistent format that the application could later read in. Alternatively, the screens may be created directly in application code, either statically, i.e., hard-coded in the application, or dynamically, i.e., being generated on-the-fly. These separate screens are defined as a set of GUI widgets or components that make up that screen, including position, size, orientation, and graphics state (such as color) of each widget.

At runtime, the application would tell the animated transition system to transition from one of these screens to another. The system would then determine:

A) which GUI elements existed in both screens;
B) which GUI elements exist in the first screen but not in the second; and
C) which GUI elements exist in the second screen but not in the first.

Each of the above three situations are handled as follows:
A) GUI elements that exist in both screens would animate into their new positions/orientations/sizes/states. If the elements did not change position/size/orientation/state between screens, they may simply stay put during a transition. It should be appreciated that it is possible to have effects operate transiently on elements, such as sparkling or fading out and fading back in.
B) GUI elements that are in the first screen but not the second must transition out of the application view. This can be done in various ways, depending on the effect desired. For example, widgets can simply fade out, move off the screen in some direction, or scale in or out and disappear, or some combination of these effects.
C) For widgets that are in the second screen but not the first, these widgets must appear in some way. This is similar, but in reverse, to the techniques mentioned above in item (B). In one embodiment, a widget may simply fade into place.

It should be appreciated that one advantage of this system is that the larger idea of animating between application states can be accomplished much easier than it could be manually animating each widget. Having a system to handle all of the tedious details, such as the animation timing, the effects, the automatic placement/removal of widgets, etc. enables developers to more easily incorporate transitions into an application and at the same time allows the developers more time for application development work.

FIG. 1 is a simplified schematic diagram illustrating an animation transition system in accordance with one embodiment of the invention. The animation transition system 102 includes transition engine 104, animation layer 106, and container layer 108. In one embodiment, animation layer 106 and container layer 108 are each buffers. Animation transition system is in communication with effects engine 110. In one embodiment, effects engine 110 includes a library of component effects that may be applied to components within transition panel 118. This library of component effects includes fading, spinning, rotating, sparkling, and any other suitable animation effect. Application 100 will control the display on GUI 116. Transition panel 118 within GUI 116 is where the animated effects will occur as directed by transition system 102 and the other components listed herein. One skilled in the art will appreciate that operating system 114, through a window manager may control the windows within transition panel 118.

Timer 112 is used to trigger callbacks into the transition engine 104 at pre-determined intervals in order to trigger an effect to render itself during a transition. In one embodiment of the invention, when a transition is initiated, transition engine 104 will identify a start state of the components within transition panel 118. The transition engine 104 then signals to the application to clear the previous screen and the application sets up a next screen, which will be an end state. Thus, transition system 102 now has a beginning state and an end state for all the components within the transition panel. Timer 112 is then initiated and will call back into transition engine 104 at regular intervals. At each interval, also referred to as a timing event, transition system 102 will communicate with effects engine 110 to have a component render itself with its effect into the animation layer buffer 106.

For each timing event, this will continue until the transition has completed to the end state. At the end state, animation layer 106 will then switch to container layer 108, which contains the end state. Thus, the transition to the end/final state will go unnoticed by the user. That is, the transitions from each timing event end with an end state being displayed on transition panel 118. This end state is identical to the state contained within container layer 108.

Still referring to FIG. 1, effects engine 110 performs calculations in order to apply the effect to a component being displayed within transition panel 118. In one embodiment, effects engine 110 contains a library of effects that may be used upon the GUI components. For example, effects such as spinning, rotating, pulsating, or any other suitable effect capable of being displayed within transition panel 118, may be applied according to the calculations performed by effects engine 110. Once the calculations are completed, the effects engine renders into the animation layer 106 for each component being rendered. In essence, timer 112 calls back to transition engine 104, which then triggers effect engine 110 to render into animation layer 106. The rendered image into animation layer 106 is then displayed within transition panel 118. This process is repeated until the end effect is obtained and thereafter the image may be refreshed from container layer 108.

FIGS. 2A through 2E illustrate a graphical user interface having a transition panel in which components are transitioning through animated effects in accordance with one embodiment of the invention. Graphical user interface 116 includes transition panel 118 where the animated transitions take place. Within transition panel 118, text box 120, text 122 and component 124 exist. Moving from FIG. 2A to FIG. 2B, it is illustrated that text 122 and component 124 have moved, while Table 126 is being faded into the transition panel 118. Here, text 122 is rotating and component 124 is moving towards the top of transition panel 118. Proceeding to FIG. 2C, it should be appreciated that text 122 has rotated to a new position, Table 126 has transitioned from a faded-in state to a full-on state, and text box 120 has moved up.

In addition, component 124 has moved from a bottom region within transition panel 118 to a top region. Moving on to FIG. 2D, additional animated transitions are taking effect in that box 128 is being faded in over the region previously occupied by Table 126, which is being faded out. Text 122 is again being rotated and moved while component 124 is being faded out. FIG. 2E illustrates a transition from FIG. 2D where box 128 has been fully faded in, text box 120 has moved from the previous position in FIG. 2D, component 124 has been completely fade out, and text 122 has rotated to a new position within transition panel 118.

Figure 3:
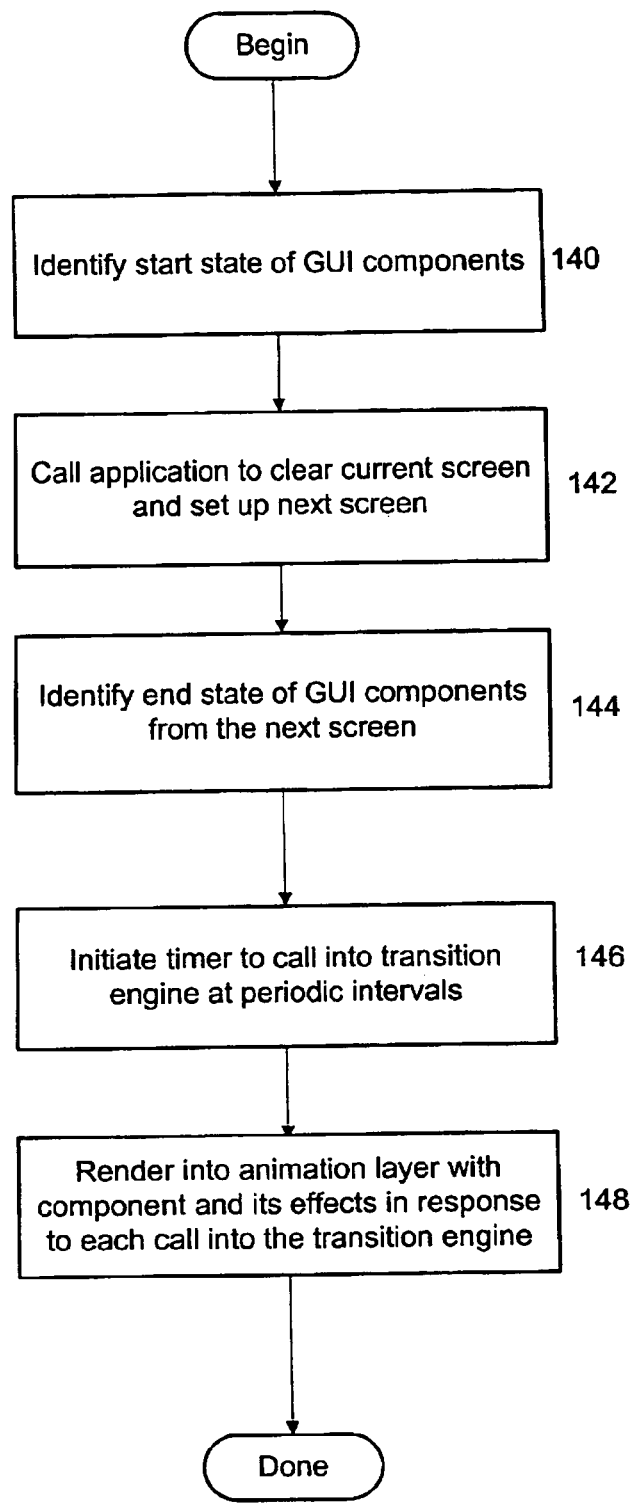
FIG. 3 is a flowchart diagram illustrating the method operations for automatically generating animated transitions between graphical user interface screens in accordance with one embodiment of the invention.

FIG. 3 is a flowchart diagram illustrating the method operations for automatically generating animated transitions between graphical user interface screens in accordance with one embodiment of the invention. The method initiates with operation 140 where the start state of GUI components are identified. The start state includes the location, orientation, etc., of the component within the transition panel. In operation 142, the transition engine 104 calls into the application to clear the current screen and set up the next screen. As a result, the transition engine obtains the end state of the GUI components within the transition panel in operation 144. Accordingly, the start and end state of the components are now known and the transition engine 104 can cause the rendering of the transition states as described below. Timer logic is then initiated in operation 146. The timer logic calculates elapsed time in one embodiment, and at periodic intervals, the timer logic calls into the transition engine.

The transition engine will then call the effects engine to render into the animation layer with the component and its effects. The animation layer then displays the rendered image within the transition panel. At each call into the transition engine, the effects engine will render into the animation layer in order to display the GUI components and present an animated transition from the start state to the end state.

Thus, the embodiments described herein enable screen transitions with animated transition effects to be easily incorporated into graphical user interfaces without burdening developers to manually code each effect. Through the embodiments described above, the transition engine identifies before and after states for each component involved in a transition. The transition engine then associates an effect with each component. A timer is started by the transition engine and for each timing event the transition engine directs each effect to render itself through an animation layer into the graphical user interface. It should be appreciated that the animation layer enables transitions to be visible during the transition time, however, after the transition period has ended the animation layer becomes invisible and the container layer, which is the buffer where the components actually live, is used as a source for the image data to be displayed. This split allows the embodiments described above to validate components in after screen while keeping that GUI hidden until the transition is complete.

Typical effects in SWING applications are limited to individual components: buttons that pulsate, scrolling lists that expand smoothly, images that fade in or out. While this is interesting and potentially useful, the embodiments described herein enable a powerful tool allowing a user to perform these kinds of things at the application level instead of the component level. One skilled in the art will appreciate that SWING is a GUI toolkit for Java. SWING is one part of the Java Foundation Classes (JFC) and includes graphical user interface (GUI) widgets such as text boxes, buttons, split-panes, and tables. While some of the embodiments described herein refer to SWING, it should be appreciated that this is not meant to be limiting as the embodiments may be applied to any object oriented application GUI toolkit.

As, discussed above, animated transitions, or the ability to smoothly move from one state of an application to another is more than simply animating the translucency of a button, or the location of some other component; it is all of this and more, for potentially every component in the application. Imagine an application that has several simple components in its GUI; text entry fields, labels, icons, buttons, and so on. Clicking on a Submit button causes the application to switch to a different screen where many of these elements are the same, but they are in different locations, or different sizes or orientations. Meanwhile, many of the components went away and some new components joined the GUI. The embodiments described herein animate all of these transitions, or whatever subset a user thought was interesting and productive for a particular application.

An application changes state several times in its lifetime. Entering data on one screen causes a query to some database that results in data and entry fields in a different screen. Entering data or otherwise interacting with that new screen causes the application to move to a different screen, again with a different set of components for that new screen.

Whether these screens are static, where their content is pre-determined at code-writing time, or dynamic, determined at runtime by processing the data entered by the user, the application will understand these as different states. The ability to understand and separate these separate states of the application, enable the application to work with the SWING effects discussed herein to make the screen transitions smoother and more effective than the typical recreate-the-GUI-completely transitions of traditional GUI applications.

The animated transitions framework described herein centers around the ability of an application to define these different "screens" of an application. In one embodiment, the focus is on 2 screens of an application at any given time: the current state of the application that the user is about to leave and the next state that the user is about to enter into. Given this "before" and "after" information, the framework can calculate and render an animation which transitions smoothly between these two states.

One of the first questions that occurs to SWING programmers might be: "How can we define the next screen with all of the layout details without the user seeing what we're doing?" That is, if you need to tell the animation system where you want all of the components to be in the next screen, you're going to have to force a SWING layout to get it right. In one embodiment this could be pre-determined for static screens and the information stored. However, this sounds tedious and presents maintenance problems. In addition, this solution skips the more interesting and useful case of dynamic screens where you want to transition smoothly from screens that are dynamically determined at runtime. In another embodiment, which provides a general solution, the components are positioned within the layout system for real. However, doing this would mean the user would see the rearranging of the components on the screen before the animated transition runs.

Fortunately, there are techniques to force a SWING layout without causing onscreen updates visible to the user. A couple of embodiments were implemented in the framework and the details are described in more detail below:

Hide in plain sight approach: This approach uses the glass pane of the window to hide the details of layout. During the transition process, the framework automatically determines the current screen information. The framework is capable of creating an image of this screen, like a Hollywood backdrop that takes the place of a real castle in the distance. The framework paints this image into the glass pane and then makes the glass pane visible. The image is opaque so that nothing below shows through. Then, the framework tells the application to rearrange the application window according to the layout in the next screen. This layout happens dynamically, but is hidden from the user by the opaque glass pane; as far as the user can tell, the application is still in the first screen state. One skilled in the art will appreciate that the glass pane is basically a SWING drawing canvas that overlays the entire window. If the glass pane is made visible and rendered into, then that rendering will be drawn after. Therefore, this rendering appears on top of any other rendering in the window.

Hide out of sight approach: The second approach is to actually make the application's container for the screens invisible prior to layout. This approach works similar to the Hide in plain sight approach above, except that the user sees a different container (which is set up to look just like the previous screen) instead of the true container for the components. Meanwhile, the framework asks the application to perform the layout changes necessary for the second screen, which all occurs dynamically off-screen.

Once the layout changes are performed for the second screen, the framework can determine the component information it needs from this layout and the framework can then run the animation. It should be appreciated that the transition is quick in nature, so that there are no unexpected results, such as the user clicking on an image of the application state and not getting a response from the components in that image.

The framework also addresses the issue of how to animate a changing layout between the screens. A SWING programmer may have concerns as one cannot simply position a component in a particular (non-null) layout manager and expect that position to override the constraints imposed by the layout manager, and one would have difficulty animating components between screens if the animation had to adhere to layout constraints. The mechanism for this is actually fairly straightforward in the embodiments described herein. The mechanism involves disconnecting the actual layout in the two screens from the animation of the GUI components during the transition. Suppose there is an initial screen where all of the components exist in certain locations, sizes, and orientations, and a second screen with the same attributes for these and other components. Regardless of the layout managers involved, each of these components has an absolute position, size, and orientation in either or both states of the container. Given those absolute positions, sizes, and orientations, a transition can be created that repositions, resizes, and reorients components as necessary. For the components that exist in one screen and not in the other, a transition can be automatically created that makes that component either come into being or go away.

The framework is capable of animating between the two states without bumping into layout manager constraints. The animation is run in a separate component that exists solely for running the animation in order to achieve this feature. The separate component is set up with a null layout manager so that all components inside of it can be moved and positioned absolutely. During the time of the animation, this component is the one that the user will see instead of the original application container. When the transition is completed, the animation container is replaced by the true application container, which now contains the layout of the second screen. These container switches are transparent to the user because, by definition, the animation container looks exactly like the application container's first screen at the start of the animation and exactly like the application container's second screen at the end of the animation.

As an example, consider an application that starts out with a simple search engine user interface (UI). On the first screen of the application, there could be a simple label and text entry field, and some explanatory text. Once the user enters text into the field, a second screen will appear that has the search results listed, along with a smaller version of the label and text entry field on the first screen.

Without animated transitions, the application would behave as follows:

The user enters text in the text field and clicks on the Search button;

The text-entry screen disappears and the results screen is displayed.

With animated transitions, the application could connect the experience of the two screens more smoothly as follows:

The user enters text in the text field and clicks on the Search button;

The label, text field, and Search button become smaller and move into place at the top of the results page;

The explanatory text fades away or moves out of view;

The results fade or move into view.

As can be seen in the above transition, some elements change their size and position between screens (the label, text field, and Search button), some elements go away between the first and second screens (the explanatory text), and some elements come into view between the first and second screens (the results).

Figure 4A:
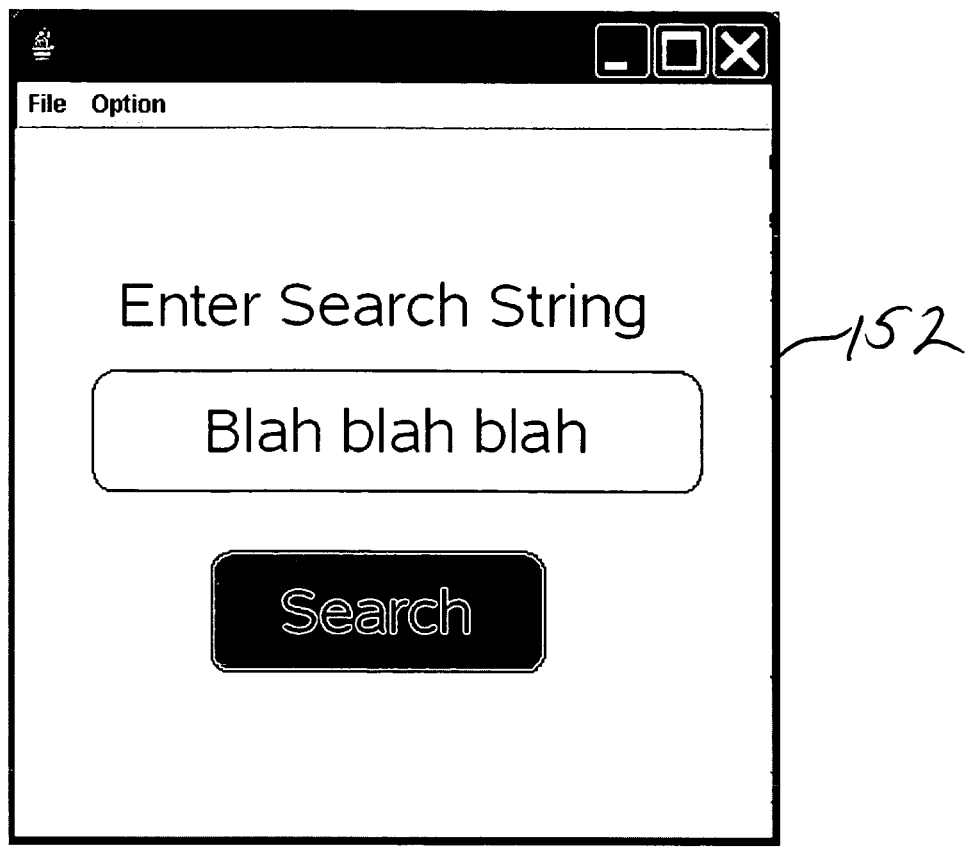
Figures 1, 4C:
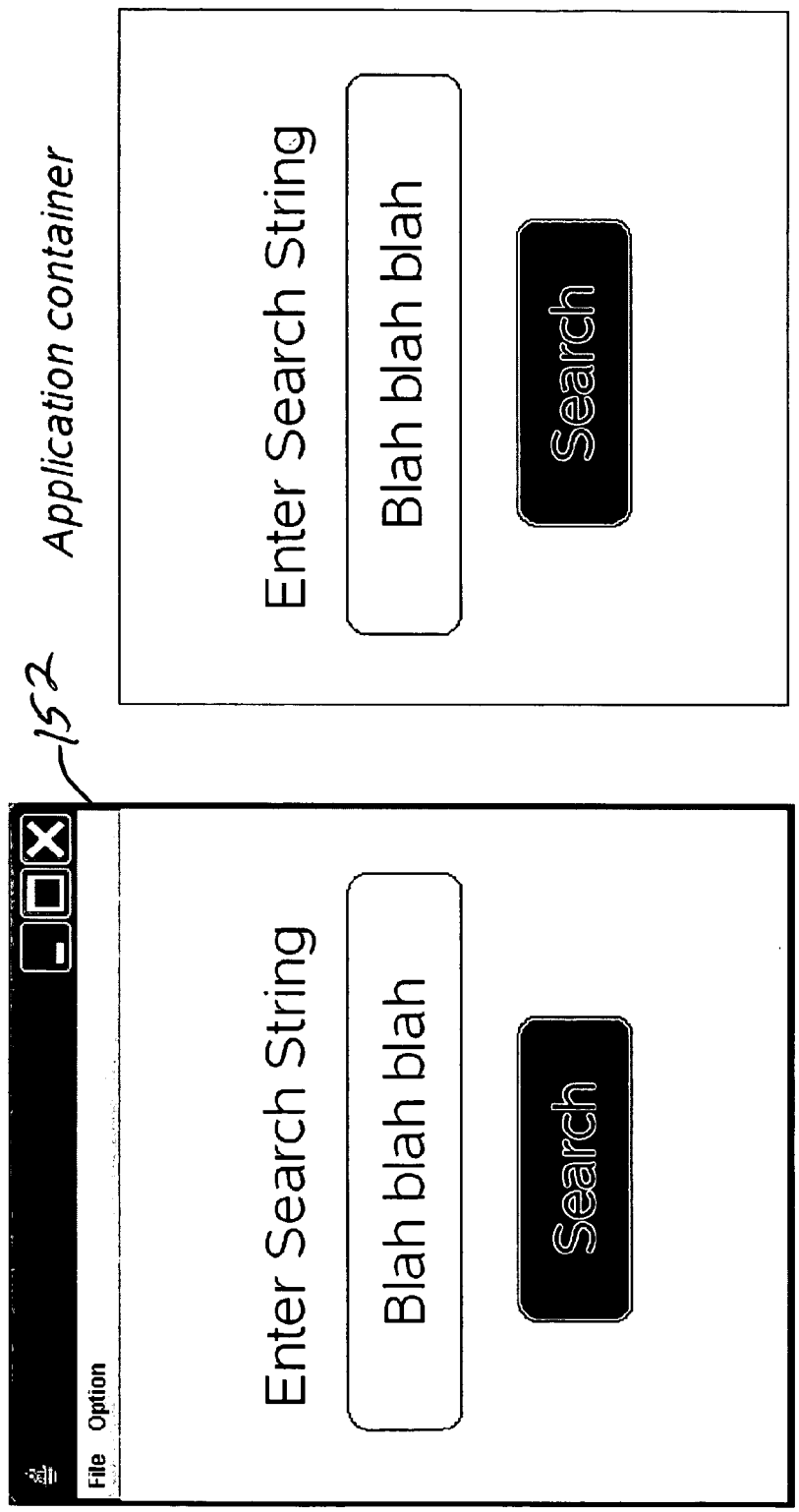
Figures 1, 4D:
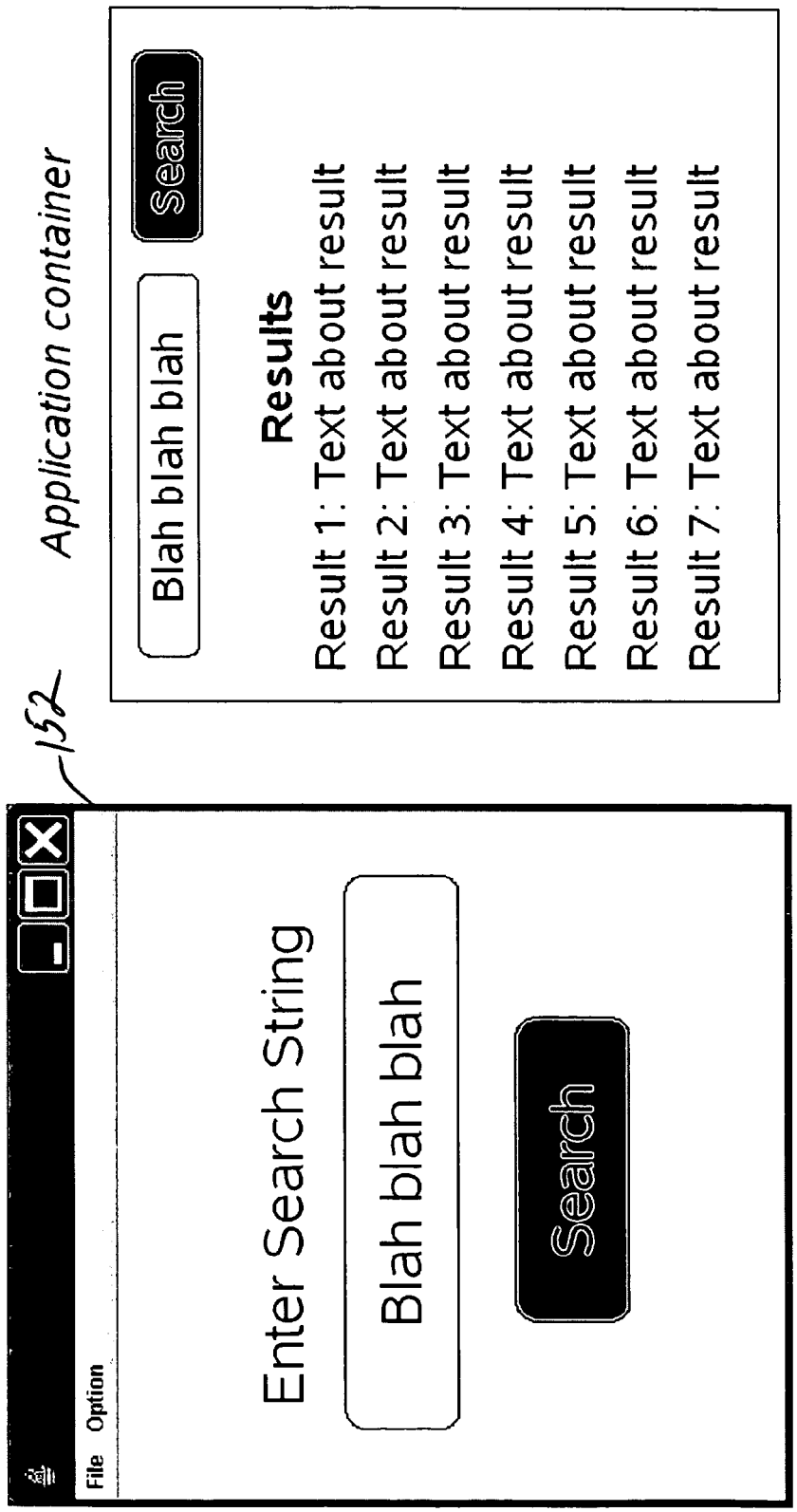
Figures 1, 4E:
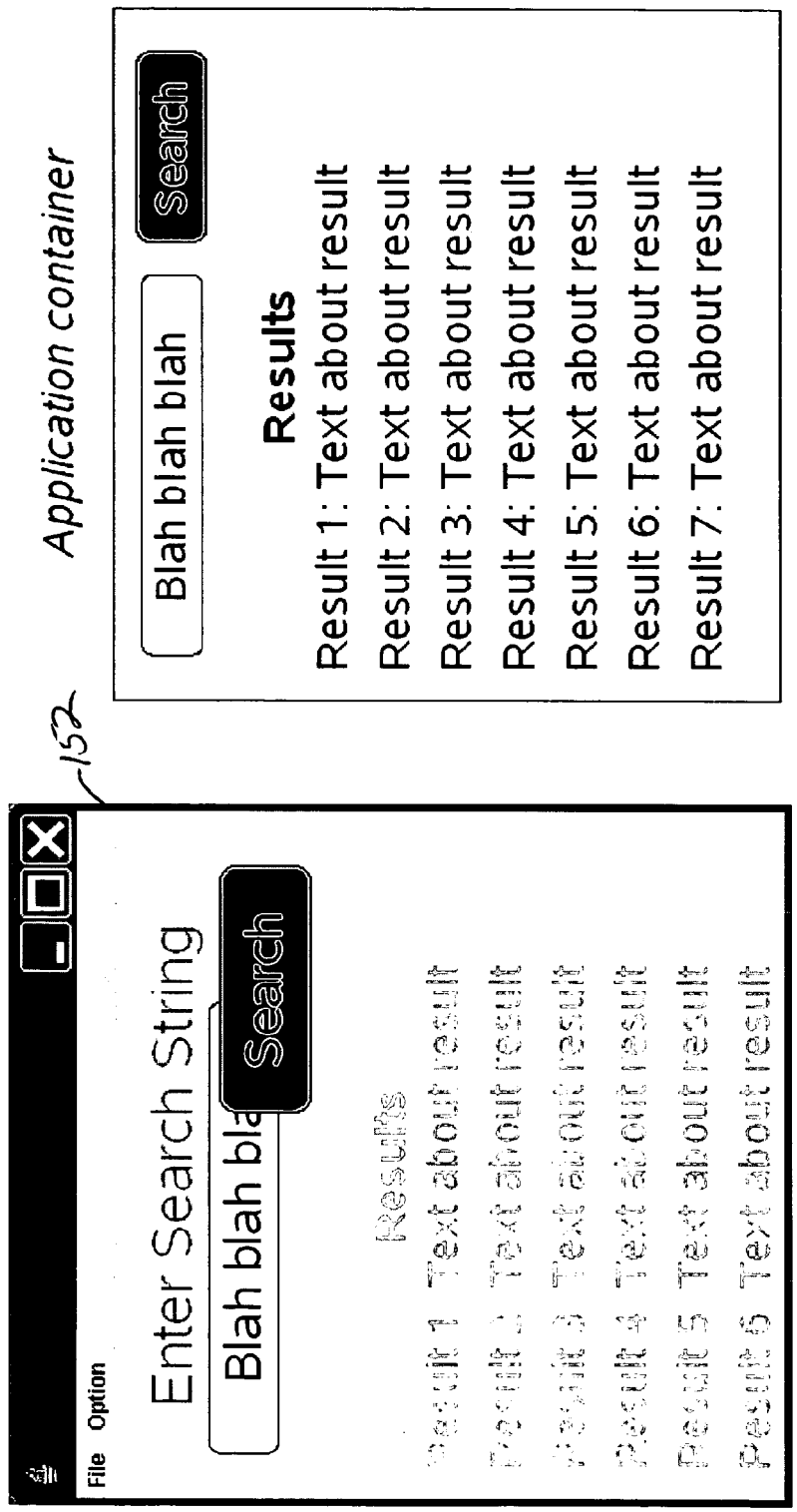
Figure 4F:
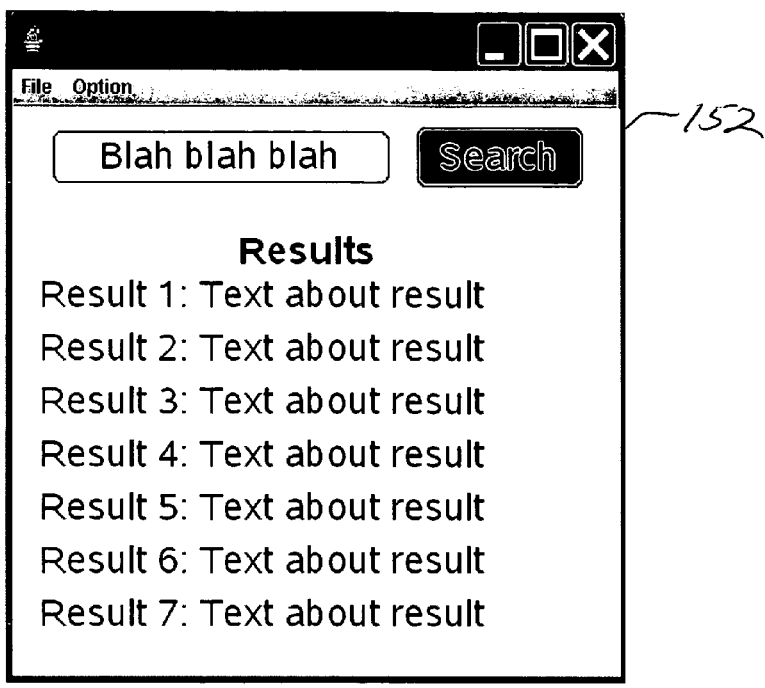

FIGS. 4A through 4F illustrate the process of the transition in accordance with one embodiment of the invention. In FIGS. 4A-F, the image with border 152 is what the user would actually see onscreen; the other images 4B-1, 4C-1, 4D-1, and 4E-1 represent what is happening offscreen. The "application container" is the container from the original application in which the application's components are arranged. The "animation container" is the component created and managed by the transitions framework for the purpose of creating and running the animated transition. In FIG. 4A a user submits a query into the application container. In FIGS. 4B-1 the framework creates an initial state of the animation container. In FIGS. 4C-1 the animation container is swapped for the application container. In FIGS. 4D and 4D-1 the application is arranging a state for a next screen. In FIGS. 4E and 4E-1 the animation runs onscreen. Here the text field and search button move/resize, while results fade/move in. In addition, the "Enter Search String" text fades/moves out. In FIG. 4F the animation ends and the animation container is swapped for the application container.

In one embodiment, each of these elements are animated individually. Using timers, SWING components, Java2D, and animated effects rendering, it is possible to create separate custom animations for each of these elements that does the right thing (move, scale, fade, etc.). But given the myriad of effects that are needed and the large numbers of elements and screens that a typical application would need to manage, this may seem like a lot of work for the developer, and would probably result in the work not getting done, which explains why there are not more animated transitions out there today.

The embodiments described herein further provide a framework that manages all of these animations. The Animated Transitions framework automatically captures the information about all of the components of each screen, determines which effects to apply during the transition (as described more completely in U.S. patent Ser. No. 11/475,520, which has been incorporated herein by reference), and runs the transition animation.

The basic usage of the AnimatedTransitions framework is straightforward; a ScreenTransition object is created, which manages the transition. The ScreenTransition is provided a container (a JComponent) that it should do the transitions on and a TransitionTarget that will act as the destination for callbacks that ScreenTransition will make. Note that this container need not be the entire client area of the application window; that is the transitions can occur in sub-components of the window. The set up of the container is as normally would be and call startTransition (transitionTimeMS) when the user wants the transition to start (transitionTimeMS) is the amount of time, in milliseconds, that one wants the transition to take from start to finish.

Once startTransition( ) is called, ScreenTransition is in control and the application needs only respond to callbacks as necessary; the rest of the details are handled by the framework. The callbacks implemented are those methods defined in TransitionTarget, and the methods always happen in the same order:

resetCurrentScreen ( ): This gives the application a chance to clean up the current GUI state to some default state, such as removing all components in the container. The reason for this is that the framework will take a "snapshot" of the GUI in this reset state to use as a background image of the animation container during the animation.

setupNextScreen ( ): This method is called when the framework wants to arrange the GUI in the component for the end state of the transition; this is what one wants the container to look like when the animation is done. A user may add, remove, move, resize, and generally arrange the components in the application container to suit their needs. From this container, ScreenTransition infers the state of the container that it needs to animate to in the transition. After returning from setupNextScreen( ) the animated transition begins; the framework has everything that it needs to calculate and run the animation.

transitionComplete( ): This method is called as soon as the transition finishes. The user does not necessarily need to do anything in this method, it is simply a convenience in case the application has any actions that are pending completion of the transition.

Thus, all the necessary method calls involved in running the transition have been provided: the code calls startTransition (transitionTimeMS) and then ScreenTransition calls the three callback methods above, resetCurrentScreen( ), setupNextScreen( ), and transitionComplete( ). Described further below are the details of what is actually happening inside to create and run the animation.

When startTransition (transitionTimeMS) is called, ScreenTransition iterates through all of the components in the transition container and registers the relevant attributes of those components, such as their absolute position and size. ScreenTransition creates simple data structures to hold those values; these structures will be added to later and used during the animation as necessary. ScreenTransition now has the information it needs for the "from" state of the transition; that is what state the animation will start in is now known.

Now that the correct starting state for the transition is known and the framework is about to request the finishing state, the physical container is hidden from the user. After all, it is desired for the user to see a smooth transition from start to finish, not an abrupt change as the GUI is modified on the fly. It should be appreciated that there are 2 components at work here; one is the actual container created by your application, and the other is a simple JComponent of the same size in which we will run the animation. ScreenTransition next calls the resetCurrentScreen ( )method in the user's code, which takes the container back to some steady state (usually cleared altogether). When this method returns, ScreenTransition takes a snapshot of the container. This snapshot (simply an image) will be used later as the background to the transition animation. It should be noted that this step is not necessary in all situations; the framework could do something much simpler like have a blank background for the animation. However, if your container has any non-standard background at all, such as a gradient fill or an image, then this snapshot is needed to make the animation container look just like the application container.

Now ScreenTransition needs the other half of the information; that is, it needs to know where to animation "to". ScreenTransition calls setupNextScreen ( )method at this point, where the code sets up the GUI that will be the end state for the animation. When this method returns, ScreenTransition again registers the relevant attributes of the components, as it did when startTransition began. This time, ScreenTransition notes components that are the same between the "from" and "to" states.

Once ScreenTransition has all of this information, the animation can begin. ScreenTransition creates and starts a TimingController to last for the duration specified in startTransition (transitionTimeMS). The timer will call back into the timingEvent ( ) method of ScreenTransition. When this method is called, ScreenTransition will render the next frame of the animation and copy it to the screen. Each frame is rendered in the following manner:

Draw to an offscreen image: All rendering of each animation frame takes place on an offscreen image, which is the same size as the container. This image is created in startTransition( ) and we get the Graphics for this image at the beginning of the timingEvent( )method. This is the destination Graphics for all rendering.

Draw the background: The snapshot image taken after resetCurrentScreen ( ) is copied to the Graphics of the offscreen image.

Draw all components: ScreenTransition has an AnimationManager object that manages all of the begin/end data structures for each of the components involved in the transition. For each frame of the animation, AnimationManager paints all components appropriately into the Graphics object of the offscreen image. This process of painting the components uses the effects framework, described later in this article. Once AnimationManager is done with this process, the animation frame is complete.

Make the animation frame visible: Now that the entire frame has been rendered, it is time to make the frame visible to the user. To do this, the GlassPane of the owning JFrame is used. The Graphics for the GlassPane is obtained, the offscreen image is copied into that Graphics (remembering to account for any offsets and clipping information when the transition container does not occupy the entire JFrame area), and a repaint( ) is forced on the JFrame, which draws the Glass Pane. In another embodiment, there are alternative ways to approach this last operation, such as having an entirely separate component that takes the place of the application's container for the duration of the animation. It should be appreciated that the GlassPane was selected in one embodiment, but is not meant to be limiting, as the framework works well with these other approaches.

The animation will run in the container for the duration specified in startTransition ( ). At the end of the animation, the layer showing the animation will be made invisible and the actual container will again be visible, with all of its components in the end state of the transition. Now the application is ready for more user input.

The following items specify some of the implementation details of the embodiments described herein:

As mentioned above layout is almost irrelevant: There is no reason that complex (and different) layout systems in the "from" and "to" screens cannot be handled as easily in this system as simple or null layout; all the framework needs to do is calculate the positions and orientations of the components in both screens, in absolute coordinates relative to the container. Then, the animation runs using these absolute coordinates, ignoring the layout managers involved.

Reuse of components: Further details of this are provided in the discussion of effects in U.S. patent Ser. No. 11/475,520 (which has been incorporated by reference), but it should be noted to reuse the actual component objects across screens. That is, if one screen has a button "Blah" and the next screen also has a button named "Blah", then one should use the same object in both screen representations. One may want to ensure that transitions which simply change the position/size/orientation of objects know which objects are present on both screens. If, for example, a different object for each button is created on each screen, then the framework would not know that they were meant to be the same, and would pick some transition that was appropriate for components that appeared or disappeared between screens instead.

GlassPane allows a way to automatically layer the animation on top of the existing contents in the window, without adding/removing containers. GlassPane is a layer on top of all other components in the JFrame. GlassPane is invisible by default, but one can make it visible and assign a JComponent to be the Glass Pane via JFrame.setGlassPane ( ), which basically lets a custom component to be layered over the entire area of the JFrame. There are two caveats here:

Glass Pane must be free: If the application is already using the Glass Pane for some other purpose, the framework will conflict with this. It will basically swap out the application's Glass Pane for its own custom component that it uses for animations. The framework or the application would need to be modified to allow shared usage of the GlassPane or one of the two users of it would need to find a different way to do business in order to eliminate this caveat.

GlassPane occupies entire JFrame area: Since the GlassPane covers the entire JFrame area, and the animated transition container may only be a sub-component inside the JFrame, both offsets (a translation factor) will need to be adjusted and clip bounds when the GlassPane is copied to in order to ensure drawing into the correct area of the window.

Sub-containers that change layout are not handled in the embodiments described herein: The system is suitable for simple cases where a series of components in your container animate from state to state. This works for simple widgets like buttons to more complex components like tables. It even works for complicated sub-containers with many sub-components. But, the system is not designed for any sub-container whose layout changes between states. That is, the current framework will animate overall components between states, but will not animate changes that occur within those components. For example, if a container that had two lists, A and B, and in the first screen, list A has items 1, 2, and 3, and list B has items 10, 11, and 12. In the second screen, list A has items 1 and 3 and list B has items 10, 11, 2, and 12. Note that item 2 moved from list A to list B. The current framework would animate the transition between these screens, but only insofar as the two lists changed position, size or orientation; it will not animate the altering state of the lists during the transition (such as moving item 2 from list A to list B). Assuming the lists did not otherwise alter, what the user would see is the lists remaining static during the transition and then changing suddenly to the state of the second screen as the transition ends. In on embodiment, this is able to be worked around by clever custom effect programming, as disclosed in U.S. patent Ser. No. 11/475,520.

It should be appreciated that the embodiments described herein may be utilized with any object oriented programming language. Additionally, the above described embodiments may be incorporated into a desk top environment or a handheld/portable computing environment. In order to simplify the approach to animated transitions, a framework for "Component Effects" which gives developers the ability to specify which effects/transistions should act upon components in certain situations, or even to define their own custom effects has also been provided. In one embodiment, the ability to subclass and override Effects behavior means that application developers can define custom effects, or even custom compositions of other effects, and a system that uses the Effects framework will automatically use the developer's approach appropriately.

The invention has been described herein in terms of several exemplary embodiments. Other embodiments of the invention will be apparent to those skilled in the art from consideration of the specification and practice of the invention. The embodiments and preferred features described above should be considered exemplary, with the invention being defined by the appended claims.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. An electromagnetic wave carrier may also be considered a computer readable medium. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

What is claimed is:

1. A computer implemented method for transitioning a widget in a graphical user interface between graphical user interface screens, comprising method operations of:
   identifying a start state of the widget within a transition panel;
   identifying an end state of the widget within the transition panel;
   triggering timer logic to periodically call a transition engine;
   calling an effects engine in response to the triggering;
   rendering a next state of the widget into an animation layer; and
   displaying the next state of the widget.

2. The method of claim 1, further comprising:
   creating an animation container through the transition engine.

3. The method of claim 2, further comprising:
   swapping contents of the animation container with contents of an application container.

4. The method of claim 1, wherein the method operation of identifying a start state of a widget includes,
   iterating through widgets within a transition container; and
   registering attributes of widgets.

5. The method of claim 1, wherein the method operation of identifying an end state of a widget includes,
   identifying a graphical user interface (GUI) designated as the end state;
   registering attributes of widget of the end state GUI.

6. The method of claim 5, further comprising:
   identifying widgets that are identical between the end state and the start state.

7. The method of claim 1, wherein the method operation of rendering a next state of the widget into an animation layer includes,
   drawing an offscreen image; and
   drawing a background into the offscreen image.

8. The method of claim 7, further comprising:
   drawing each widget into the offscreen image;
   forcing a repaint on a JFrame to make contents of the offscreen image visible.

9. The method of claim 7, wherein the method operation of drawing a background into the offscreen image includes,
   resetting a current GUI state to a default state; and
   generating a snapshot of the reset GUI in the default state.

10. The method of claim 1, wherein the method operation of rendering a next state of the widget into an animation layer includes,
    determining if a transition container is a same size as the transition panel in order to make adjustments through offsets and clipping information.

11. The method of claim 1, further comprising:
    continuing to call the transition engine until the next state matches the end state.

12. A transition framework configured to present animations between graphical user interface (GUI) screens, comprising:
    a transition, system configured to communicate with an application the display of image data, the transition system including,
    a transition engine configured to initiate the animations by calling timer logic;
    an animation layer configured to store image data representing successive animation transitions in response to corresponding successive invocations initiated by the timer logic;
    a container layer configured to store image data representing an end state of the animations; and
    an effects engine in communication with the transition system, the effects engine calculating position data for widgets associated with each successive animation transition, the effects engine writing the transition data into the animation layer for display, wherein the transition system extracts both a first state of widgets within a GUI screen and an end state of widgets within the GUI screen, the first state and the end state representing limits as to the widgets of the animation transitions.

13. The transition framework of claim 12, wherein the animation layer image data is swapped with data from an application container to display the animations.

14. The transition framework of claim 12, wherein the transition system is further configured to take a snapshot of a current GUI state for use as background during a next state.

15. The transition framework of claim 14, wherein the snapshot is taken after resetting the current GUI state to a default state.

16. The transition framework of claim 12, wherein the image data of the animation layer is drawn offscreen.

17. The transition framework of claim 12, wherein each of the successive animation transitions is compared to the end state to determine if the animations between GUI screens is complete.

18. The transition framework of claim 12, wherein the animation layer data is rendered in an animation container which is invisible to a user until the animation container is swapped for an application container.

* * * * *